Dec. 12, 1944. A. N. THOMAS Re. 22,577

HYDRAULIC CLUTCH

Original Filed Dec. 2, 1939 4 Sheets-Sheet 1

Inventor:
Albert N. Thomas
By: Frank Schraeder
Attorney.

Dec. 12, 1944. A. N. THOMAS Re. 22,577

HYDRAULIC CLUTCH

Original Filed Dec. 2, 1939 4 Sheets-Sheet 2

Inventor:
Albert N. Thomas
By: Frank J. Schraeder Jr.
Attorney.

Dec. 12, 1944. A. N. THOMAS Re. 22,577

HYDRAULIC CLUTCH

Original Filed Dec. 2, 1939 4 Sheets-Sheet 3

Inventor:
Albert N. Thomas
Frank Schraeder Jr.
By: Attorney.

HYDRAULIC CLUTCH

Original Filed Dec. 2, 1939 4 Sheets-Sheet 4

Inventor:
Albert N. Thomas
By: Frank J. Schrader Jr.
Attorney.

Reissued Dec. 12, 1944 Re. 22,577

UNITED STATES PATENT OFFICE 22,577

HYDRAULIC CLUTCH

Albert N. Thomas, Dodge City, Kans., assignor to Thomas Hydraulic Speed Controls, Incorporated, Dodge City, Kans., a corporation of Kansas Original No. 2,329,230, dated September 14, 1943, Serial No. 307,207, December 2, 1939. Application for reissue January 20, 1944, Serial No. 519,063

22 Claims. (Cl. 192—61)

This invention relates to new and useful improvements in hydraulic clutches of the type or class wherein the circulation of fluid mediums, such as oil or air, or mixtures of both are controlled and regulated by a single valve for governing their flow through the elements of a suitable hydraulic pump incorporated within the clutch casing.

In hydraulic power-transmission any power-driven element such as geared shafting, a belt, or chain drive may be considered as a prime mover, drive member or driving means. The hydraulic clutch herein disclosed is adapted to be interposed as a power-transmitting unit between such driving means and a driven shaft, driven member or driven mechanism.

One of the objects of my invention is to provide a novel hydraulic clutch which is characterized by comparatively high efficiency, simplicity of construction, and flexibility in operation and control.

Another object of my invention resides in the provision of a novel hydraulic clutch affording a free neutral operation without the use of brake devices for the driven member. This attainment of free neutral operation is made possible through the novel valve and port constructions and arrangement of cooperative parts whereby fluids, including air and oil, are in certain operative positions of the valve utilized independently of one another and, in other positions of the valve, in progressively varied mixtures.

Another feature of my invention is found in the provision of a hydraulically and mechanically balanced clutch mechanism, including a single slidable cylindrical valve, pressure stabilizing means interconnecting all of the intake ports, and pressure-stabilizing means interconnecting all of the exhaust ports whereby the pressures and vacuums acting upon the pump elements and valve are balanced, thereby obviating the disadvantage of unequalized pressure or vacuum action upon the valve.

With the above and other objects in view, my invention consists in the novel combination, construction, and arrangement of the parts and members shown in preferred embodiment in the attached drawings, described in the following specification, and particularly pointed out in the appended claims.

The invention will be readily understood by reference to the accompanying drawings in which a typical embodiment thereof has been illustrated.

Figure 9:
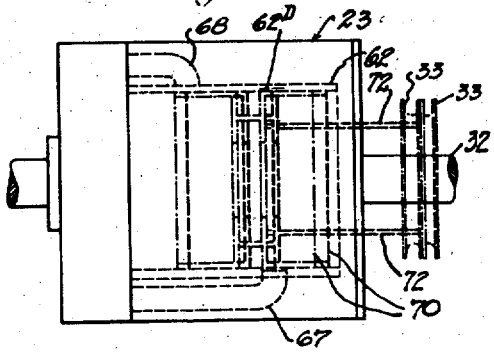
Figure 10:
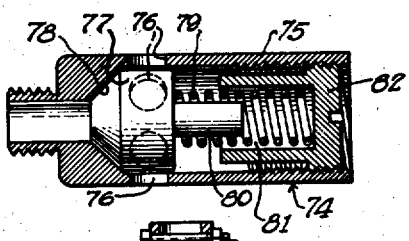
Figure 8:
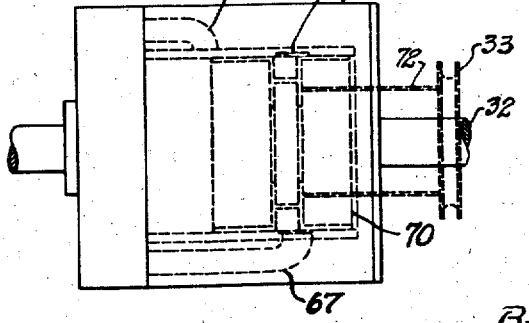
Figure 11:
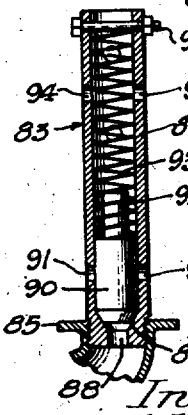
Figure 3:
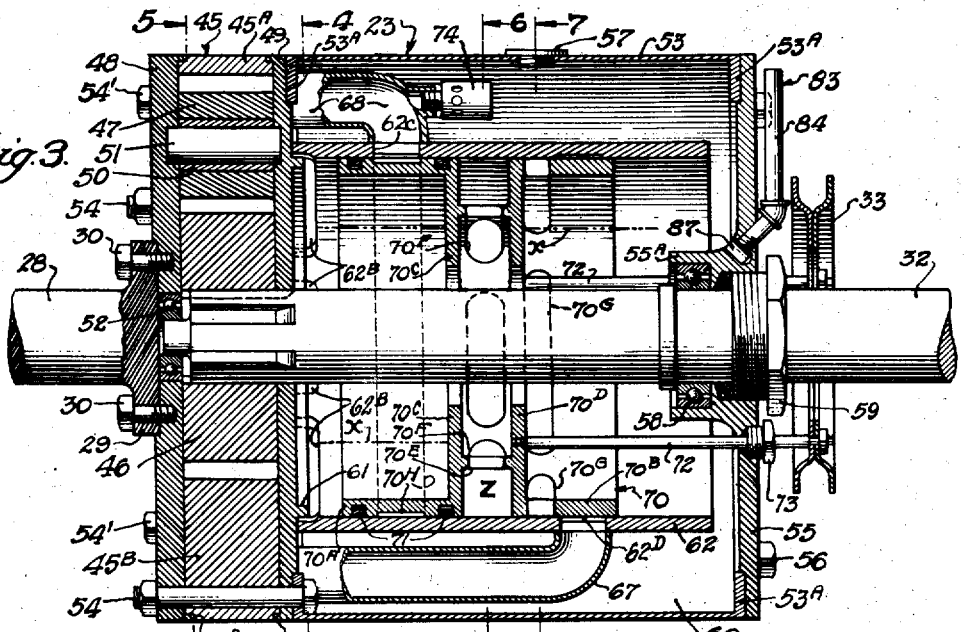
Fig. 3 is a longitudinal section of the clutch corresponding to Fig. 2 shown in full closed position with no over-run.

Figs. 4, 5, 6, and 7 are cross-sections of the clutch taken respectively on lines 4—4, 5—5, 6—6, and 7—7 of Fig. 3;

Fig. 8 is a diagrammatic illustration of the clutch showing the valve moved to a position wherein a portion of the circulating air has been replaced by the oil;

Fig. 9 is a diagrammatic illustration of the clutch showing two successive positions of the valve. The valve position shown by the heavy broken lines showing the valve moved further inwardly from the position shown in Fig. 8 wherein the intake and exhaust ports of the pump are about half closed. The valve position shown by the lighter dot and dash lines showing still a further inward movement of the valve;

Fig. 10 is a longitudinal section through one of the pressure by-pass valves;

Fig. 11 is a longitudinal section through the air expansion relief valve.

Figure 1:
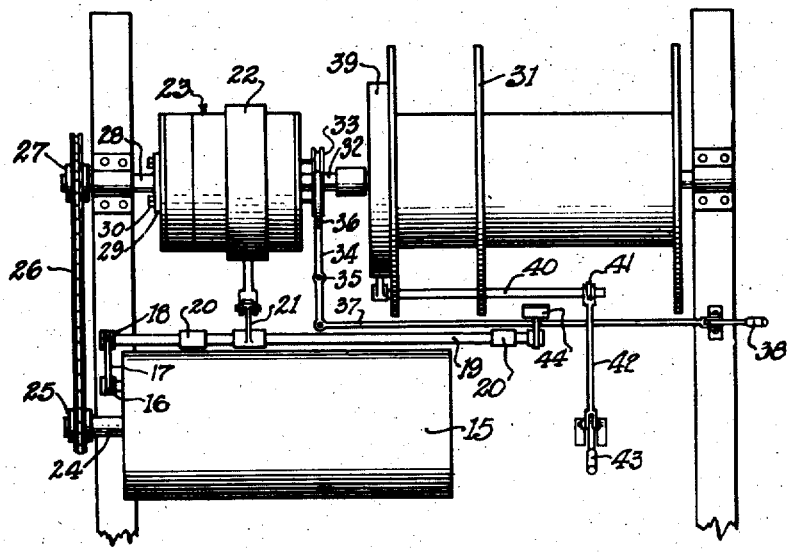
Fig. 1 is a diagrammatic plan view of a hoist showing one application of a hydraulic clutch embodying my invention.

Referring to Fig. 1, the diagrammatically shown hoist consists of a suitable engine 15 which is provided with a suitable clutch (not shown) operable by arm 16 through the link 17 and arm 18 which is fixed to the shaft 19 shown supported in bearings 20. The shaft 19 is also operatively connected by arm 21 to a holding brake 22 mounted about the hydraulic clutch 23.

The engine drive shaft 24 as shown is provided with a sprocket 25 over which is trained the drive chain 26 to impart rotation to the sprocket 27 fixed to the outer end of shaft 28. The inner end of shaft 28 is shown connected to the clutch 23 as by means of a flange 29 and cap screws 30.

The service reel 31 is fixed to the clutch driven shaft 32.

The clutch is provided with a grooved valve operating sleeve 33 slidable with its supporting rods 72 on the clutch about the driven shaft 32. The sleeve 33 is slidable into clutch-operating positions by a lever 34 pivoted at 35 and having a forked end 36 disposed in the grooved sleeve 33 and its opposite end is connected by a link 37 to the lower end of the pivoted clutch-operating lever 38.

The reel 31 is provided with an emergency brake band 39 operable by shaft 40 having an arm 41 fixed thereto and connected by link 42 to the emergency brake operating lever 43.

It should be noted that in this particular hoist application, the arrangement is such that a forward downward movement of the foot pedal 44 will first through the movement of arm 16 disengage the engine clutch (not shown) and that further continued depression of foot pedal through arm 21 will cause the holding brake 22 to retain the clutch casing against rotation.

Assuming engine 15 is in operation and the clutch valve-operating lever 38 is in open position and the foot pedal 44 is in raised or inoperative braking position, the drive shaft 24 will impart rotation to the casing of clutch 23 by means of the sprockets 25 and 27 and the drive chain 26. In such operation, the emergency brake 39 will of course rest in inoperative position.

When the clutch valve-operating lever 38 is moved to the left as shown in Fig. 1, the clutch valve, in response to such movement of lever 38, will be moved progressively toward closed position and the reel 31 will be rotated at progressively increased speeds until the fully closed valve position is reached whereat the reel 31 will be substantially synchronized in rotation with the clutch casing. Assuming now that an object is being raised by a wire-rope cable trained around the reel 31 and suitable guide sheaves and that the desired raised position of the object has almost been attained, the clutch valve-operating lever 38 is then moved back toward open position until the object comes to rest at the desired raised position and at such moment of rest the developed torque balances the weight of the object brought to rest. A further movement of the lever 38 toward open position will cause a lowering of the object and a reverse movement of lever 38, toward closed position of clutch valve, will obviously cause a lifting movement of the object. If so desirable, the emergency brake operating lever 43 may be moved into operable position to cause the emergency brake 39 to hold the object at rest in suspended position against any possible movement in either up or down direction. However, if such object is brought to rest in balanced position and such emergency brake 39 has not been brought into braking operation, the suspended balanced object may with slight effort be manually raised or lowered or spotted at the desired precise elevation.

If the foot pedal 44 is fully depressed, the arm 16 will act to disengage the engine 15 from operation of the shaft 24 and the clutch 23 and, at the same time, the holding brake 22 will be brought into braking operation with the casing of the clutch 23. In such operation the hydraulic clutch 23 may be used as a hydraulic brake, the rate of descent of the suspended object being controlled by lever 38 whereby open position of the clutch valve will permit full speed lowering and full closed position of the clutch valve will bring the object to a stopped suspended position.

The operator may change from hydraulic braking operation to clutch operation by proper manipulation of levers 44 and 38, or may use operating lever 43 in combination with operating levers 44 and 38.

Referring now to the clutch illustrations shown in Figs. 2, 3, 4, 5, 6, and 7, my improved clutch 23, as preferably shown in these illustrations, consists of gear pump casing 45 preferably of cast metal having port areas cored or machined to suit the operating requirements.

The gear pump casing 45 consists of a cylindrical wall $45^A$, three radially disposed ribs $45^B$ terminating in arcuately arranged heads $45^C$ defining a well for the primary gear 46 which is splined or keyed to the inner end of the driven shaft 32. These arcuate walls $45^C$ are disposed for close fit around the periphery of the teeth of the primary gear 46 and constitute compression walls for the fluid or fluids passing through the pump.

Two or more circularly equally spaced secondary gears 47 are provided which are in mesh with the primary gear 46. I have preferred to show three of such secondary gears 47 but one or more may be used. The secondary gears are each positioned in a well defined by a pair of oppositely curved-face wall extensions $45^D$ formed, like the ribs $45^B$, integrally with the annular wall $45^A$.

Figure 5:
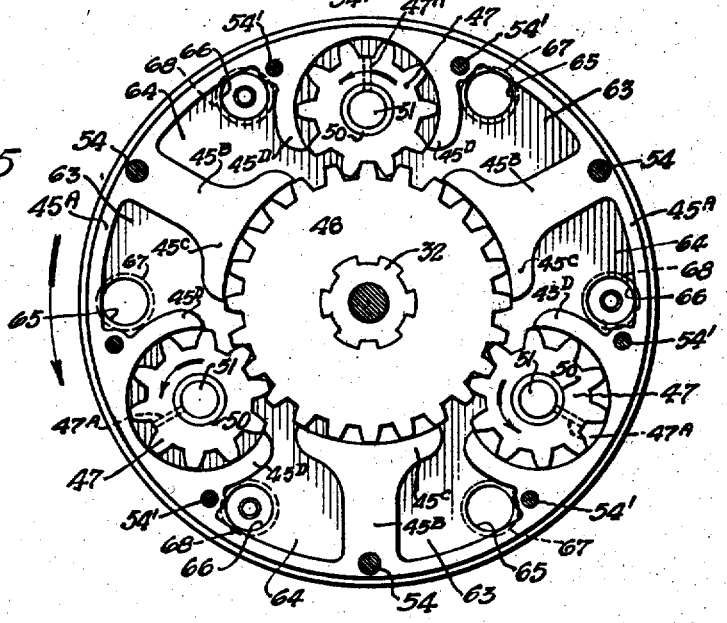
Figure 6:
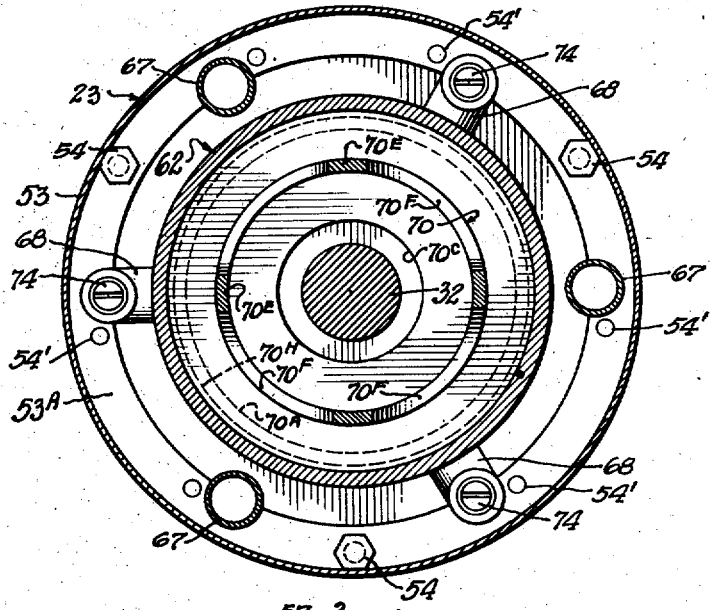
Figure 7:
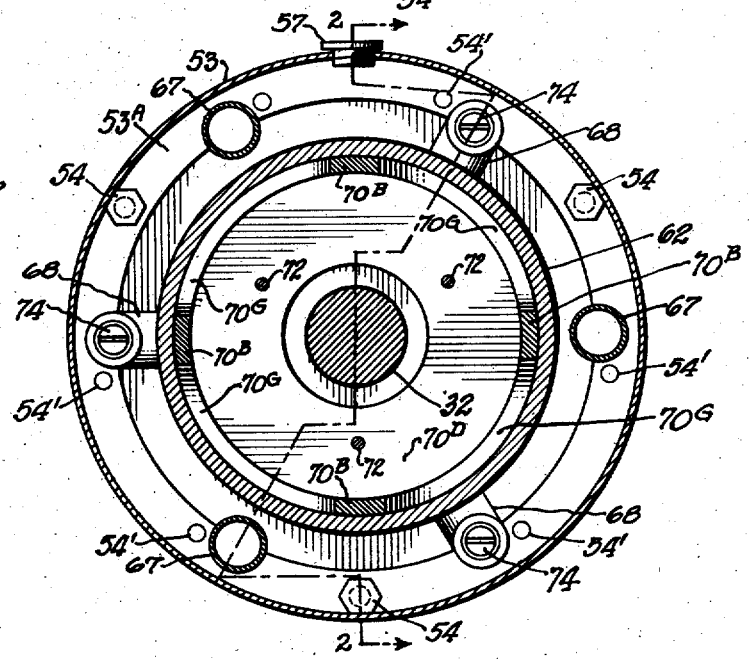

In the construction of the casting 45 as here shown in Fig. 5, the spaces 63 and 64 between the portions $45^B$, $45^C$, and $45^D$ are clear openings extending through such casting and constitute, respectively, the intake and exhaust chambers.

The pairs of walls $45^D$ constitute a circular compression wall and their extreme inner ends are disposed a spaced distance from the periphery of the primary gear 46 and the adjacent end of wall $45^C$ to provide inlet and outlet passages for the circulating fluid therebetween.

The gear pump casing 45 includes an exterior circular metal wall or head 48 to which the flange 29 of the drive shaft 28 is secured by the cap screws 30. For patent purposes the shaft 28 may be termed as a prime mover or driving means and rotary power could also be applied directly to the clutch housing 53 as by a belt or gearing.

The inner face of the pump casing 45 is provided with a circular metal port or manifold plate 49.

These plates 48 and 49 are preferably formed with circular alignment rims, respectively $48^A$ and $49^A$ which are adapted to be seated in machined grooves of the casting 45. Sealing means providing fluid-tight joints, such as suitable gaskets, may obviously be used. The plates 48 and 49 also constitute side compression walls for the pump gear system.

The secondary gears 47, as here shown, are provided with suitable bearings 50 and the ends of their supporting pins 51 extend into suitable circular recesses formed in the head plate 48 and the port plate 49. Each secondary gear is provided with a suitable oil hole $47^A$.

Figure 2:
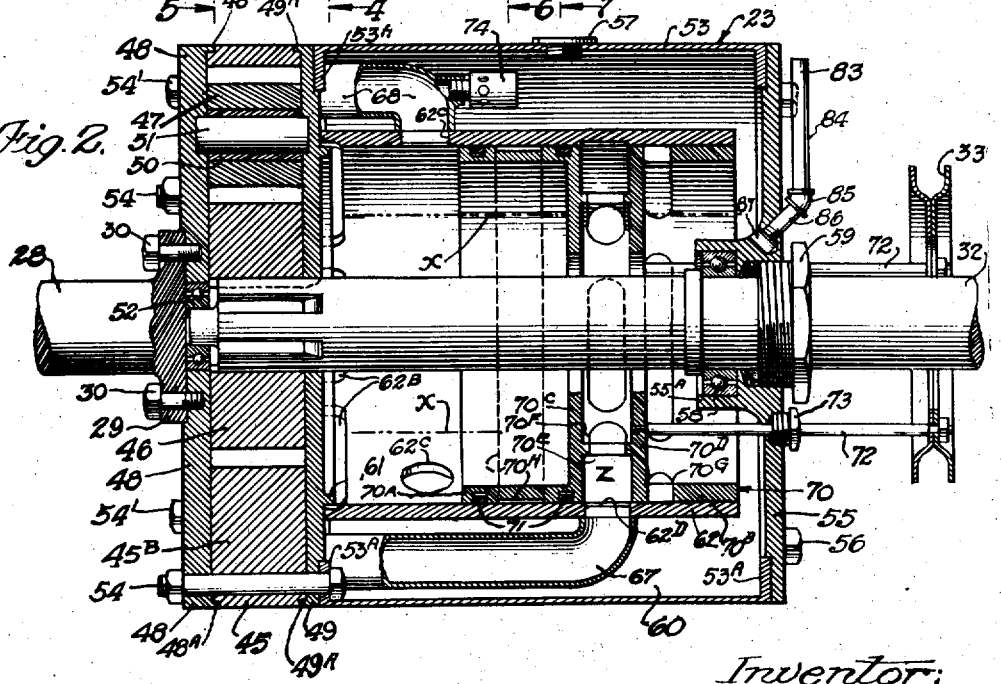
Fig. 2 is a longitudinal section of the clutch taken on line 2—2 of Fig. 7, showing the valve in full neutral or open position.
Figure 4:
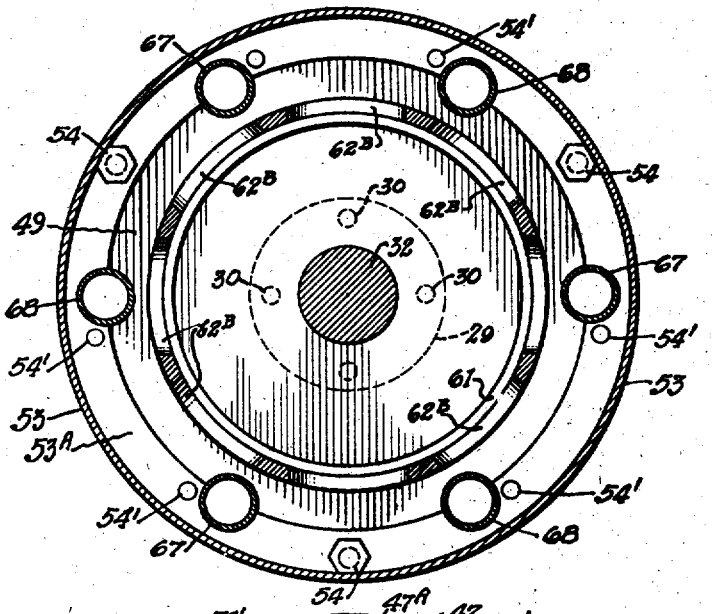

The head plate 48 is also provided with a central circular recess which is adapted to receive a pilot ball-bearing 52 for the inner end of the driven shaft 32 which, as shown in Figs. 2, 3, and 5, is of decreased diameter at such bearing support. The driven shaft 32 extends through a close fitting opening in the center of the port plate 49.

The casing 45 and the plates 48 and 49 may be termed the fluid pump casing.

My improved clutch, which is generally indicated by 23, also includes the outer cylindrical wall or casing 53 which as here preferably shown is formed with inwardly right-angularly disposed integral end flanges $53^A$.

The port plate 49 is preferably provided with a circular recess which constitutes a seat for the inner flange $53^A$.

The pump casing, which includes the casing 45 and plates 48 and 49, is securely mounted to the flanged inner end of the exterior casing 53 by bolts 54 and cap screws 54'.

The casing 53 together with the port plate 49 and the end closure head or plate 55 constitutes the valve housing and fluid receptacle and suitable cap screws 56 securely hold the closure head 55 to the flange $53^A$. The head 55 and port plate 49 are circularly recessed for the flanged ends $53^A$ of the casing 53 to facilitate alignment of these parts, as shown in Figs. 2 and 3.

A suitable screw plug 57 is provided for the inlet opening through which the clutch reservoir 60 is properly filled with a suitable oil of the desired viscosity. Oils of a wide range of viscosity are adaptable for use in this type of clutch.

The end closure head 55 is cast with an inwardly disposed integral hub $55^A$ which is adapted to support a ball-bearing 58 for mounting of the driven shaft 32 and a suitable screw type packing gland nut 59 is provided as shown in Figs. 2 and 3.

The port or manifold plate 49 is preferably provided with a circular rim 61 about which is seated the hollow cylindrical valve seat 62. The valve seat 62 is welded or otherwise secured to the rim 61 or may be formed integrally therewith.

Assuming that the rotation of the clutch is anti-clockwise as indicated by the arrow in Fig. 5, the intake chambers of the gear pump are indicated by numeral 63 and the exhaust chambers by 64.

The port plate 49 is provided with intake openings 65 and exhaust openings 66 to which are secured, in any suitable manner, the intake and exhaust conduits or pipes respectively indicated by 67 and 68. These intake and exhaust conduits are disposed within the oil reservoir 60 and terminate in curved ends which are secured to the hollow cylindrical valve seat 62 which is provided with openings in register with such curved ends.

The discharge ends of the exhaust conduits 68 communicate with openings $62^C$ which extend through the valve seat 62 and the openings $62^C$ are circularly plane-aligned.

The inlet ends of the intake conduits 67 communicate with the annular stabilizing port $62^D$ formed in the inside face of the valve seat 62.

The valve seat 62 is also provided with a plurality of circularly spaced elongated openings $62^B$ to permit oil or air to escape into the chamber 60. The outer or free end of the valve seat 62 is spaced from the inside face of the end closure plate 55.

Slidably mounted within the valve seat 62 is a hollow cylindrical valve 70 which consists of the pair of spaced cylindrical wall sections $70^A$ and $70^B$ having spaced annular walls $70^C$ and $70^D$. These walls $70^C$ and $70^D$ are disposed preferably right-angularly to their respective intgeral cylindrical valve sections $70^A$ and $70^B$ and extend inwardly to a spaced distance from the shaft 32. The walls $70^C$ and $70^D$ are integrally connected by a cylindrical transverse wall $70^E$ which is of a diameter less than the diameter of the valve sections $70^A$ and $70^B$ and is provided with a plurality of circularly spaced elongated openings $70^F$ to permit the passage of air therethrough for free neutral operation of the clutch when valve 70 is in the position shown in Fig. 2.

Sealing rings 71 may be used to secure a more perfect or fluid-tight joint between the slidable valve and its seat 62.

The valve 70 is also provided with a plurality of circularly spaced elongated openings $70^G$ to permit the passage of oil therethrough as and when the valve 70 is moved from neutral toward closed position.

The valve 70 is provided with a pressure-stabilizing port $70^H$ in the form of an annular recess situated in the outside face of the valve portion $70^A$ which is operative when such valve is positioned in closed or partially closed position. The closed position of the valve 70 and the function of such port $70^H$ interconnecting the three exhaust conduits 68 is illustrated in Fig. 3.

When the valve 70 is in fully open or neutral position the exhaust conduits 68 have unrestricted discharge through the valve seat 62 and the intake conduits 67 communicate with port Z for free passage of air through openings $70^F$ and these conduits 67 are interconnected by the pressure-stabilizing port $62^D$, as illustrated in Fig. 3, for stabilization of pressure in the event of reverse rotation of the clutch casing relatively to shaft 32.

Under such free neutral operation the shaft 32 will remain in stationary position.

The valve operating sleeve 33, which is adapted to be shifted into various desired operative positions of the valve 70 by the lever 38, is connected to the valve 70 by the circularly spaced rods 72 which extend through the packing gland nuts 73.

The exhaust conduits 68 are preferably provided with bypass valves 74. See Figs. 2, 3 and 10. These valves 74 are screw-connected to the exhaust conduits and are adapted to relieve the pump of any excessive pressures which might be caused by unforeseen or accidental overload transmitted to the clutch and are provided with adjustable pressure-regulating plugs whereby the maximum working pressure of the pump may be altered when the clutch is in stationary position.

Any suitable spring-pressed overload valve may be used. I have preferred to construct the valve 74 as shown in Fig. 10 wherein the open end casing 75 is provided with a plurality of exhaust openings 76 normally closed by the piston valve 77 which is retained in closed position at rest upon the valve seat 78 by the coil spring 79 mounted upon the valve stem 80. One end of the spring 79 is in abutment with the valve 77 and its opposite end is confined within the cylindrical cavity 81 of the adjustable pressure-regulating plug 82 screw-mounted within the casing 75.

Undue excessive fluid pressures transmitted to and through the exhaust conduits may be automatically reduced by actuation of same against the spring-pressed valves 77 to permit escape of the fluid through openings 76.

As heretofore indicated, the operation of my clutch makes use of both air and oil fluid in different operations as where air is used solely for free or neutral operation, and in other operations where varied proportions of air and oil mixtures, or solely oil, is used as the power-transmitting control medium.

It will be understood that the oil reservoir 60 is not fully filled with oil. The amount of oil employed is determined by the diameters of the central openings in the walls $70^C$ and $70^D$.

When the clutch is rotated the body of oil therein will, by centrifugal force, be caused to assume an annular shaped body adjacent the clutch casing 53 thereby producing an air space or inner core of air surrounding the driven shaft 32. The dividing surface between the air and oil bodies under free neutral operation would be about as indicated in Fig. 2 by the line X from which it will be observed that the port Z, defined by the walls 70C and 70D which project inwardly through the body of oil into the central air space, constitutes under normal operation an air port, as clearly shown in Fig. 2.

The space between the shaft 32 and the circular edges of walls 70C and 70D defining the opening around the shaft 32 must be large enough to allow a free movement of air around the shaft 32 when the pump gears are operating at their maximum speed under free neutral operation when shaft 32 is at rest.

An important feature of my invention is found in the provision of the centrifugally actuated air relief valve 83 which is designed to operate only when the clutch is in rotation to permit air communication between the interior of casing 53 and the exterior atmosphere for the purpose of reducing any undue air pressure caused by the expansion of the air within the casing under heavy duty operation.

The valve 83 consists of a tubular casing 84 connected by the elbow 85 with a pipe nipple 86 the inner end of which communicates with the air passage 87 drilled within the inner side portion of the wall 55 near the hub 55A.

The inlet opening 88 is provided with a valve seat 89 normally supporting the piston valve 90 for normally closing the transverse air discharge openings 91. The valve 90 is provided with a valve stem 92 of reduced diameter about which is mounted the coil spring 93 one end of which is in abutment with the valve 90 and the other end of which is in abutment with the bolt 95 which may be adjustably inserted through any space one of the pairs of transversely aligned openings 94 to thereby vary the pressure of said spring 93 against the valve 90.

The spring 93 is preferably a comparatively light spring to insure opening of the valve 90 upon a predetermined speed of rotation of the clutch.

It will be understood that the manifold plate 49, valve seat 62 and the intake and exhaust conduits could be cast in one piece.

In apparatus not subjected to over-running, the valve portion 70B may be dispensed with.

As shown in Fig. 2, the valve 70 is in its extreme outer position. Assuming that rotary power is applied to the shaft 28, the clutch casing 53 together with the attached pump casing will be rotated but the shaft 32 will be inoperative for power transmission, that is, the clutch 23 is in free neutral or open position since only air from the central portion of the clutch is being admitted through openings 70F and port Z into the intake conduits 67.

Under such neutral operation the air passed through the pump is insufficient to constitute, for practical operative purposes, the necessary resistant between the primary and secondary pump gears to cause power rotation of the shaft 32 and therefore the secondary gears 47 will be free for planetary rotation about the stationary primary gear 46.

The valve 70, as diagrammatiacly shown in Fig. 8, is moved slightly inwardly to such position where a small quantity of oil is being admitted for admixture with the air through openings 70G into the intake conduits 67 to provide a slight resistant between the secondary and primary gears to thus transmit a small amount of torque and rotation to shaft 32, provided such torque exceeds the load imposed upon the driven shaft 32.

In Fig. 9, two successive inward movements of valve 70 are shown. The position of the valve 70 shown by the heavy broken lines shows the valve moved slightly further inwardly from the position shown in Fig. 8 wherein about half air and half oil is passed into the intake conduits thus materially increasing the amount of power and rotation transmitted to shaft 32.

The position of the valve 70 shown by the lighter dot and dash lines in Fig. 9 indicates the initial high position of valve 70 wherein the maximum of power and rotation is transmitted to shaft 32 because no circulation of oil is possible through the pump since all exhaust conduits are fully closed with the result that the oil in the pump becomes a resistant to interlock the primary gear with the secondary gears to thereby cause an interlocked rotation of the clutch housing with shaft 32.

It will be observed from the illustrations in Figs. 2 and 3, that the valve 70 is adapted to be moved inwardly to a position whereat only oil is being admitted into the intake conduits 67 for circulation through the pump and out of the partially open exhaust openings 62C, such position of the valve 70 preceding the movement of the valve to the position shown by the dot and dash lines in Fig. 9.

When the valve 70 is moved to an object-balancing position, as heretofore described, the torque developed by the working pressure of the clutch is equal to the torque imposed upon the reel by such balanced object.

The position of the valve 70 shown in Fig. 3 shows the valve 70 in full high and no overrun position wherein all intake and exhaust conduits are fully closed by the valve 70. This is the innermost position the valve 70 is ever moved to and there is no movement or circulation of fluid and no relative rotation of the component parts of the pumping elements even through the driven shaft tends to exceed the driving speed of rotation of shaft 28, other than the amount of rotation necessary to build up pressure in one port system or the other. Only a fractional part of one revolution of relative rotation would be the amount of slack when the valve 70 is in this position.

Various changes in and modification of the structural details and arrangement of the parts and members may be readily made by those skilled in the art to which this invention relates without departing from the spirit of the invention embodied in the appended claims hence I do not wish to be understood as limiting myself to the exact details and arrangement shown in the accompanying drawings which are illustrative of one form or embodiment of my invention.

I claim:

1. In combination, rotary power-driven means, a driven shaft, and a hydraulic power-transmission mechanism operatively connected to said power-driven means, said mechanism including a rotatable casing having a chamber therein partially filled with oil, fluid pumping means operatively connected with said casing, said driven shaft extending into said casing and being operatively connected to said fluid pumping means, a fluid intake passage, an exhaust passage, said passages communicating with said fluid pumping means and said chamber, and an axially slidable valve for controlling fluid circulation through said passages and said pumping means actuable to permit inflow and outflow of air or of mixtures of air and oil or of oil or of neither through said passages and said pumping means to thereby control the stationary position or relative rotations of said driven shaft during the rotation of said power-driven means.

2. In the combination as embodied in claim 1 and including centrifugally responsive means providing an outlet for the air within said chamber during the rotation of the casing.

3. In the combination as embodied in claim 1 and including a centrifugally and pressure responsive valve providing an outlet for the air within said chamber upon expansion of the air during the rotation of the casing, and pressure responsive outlet means for the exhaust passage interposed between the pumping means and the valve.

4. In the combination as embodied in claim 1 said mechanism having a plurality of said fluid intake passages, a plurality of said fluid exhaust passages, and pressure-stabilizing ports, one connecting the discharge ends of all of said exhaust passages, and another the intake ends of all of said intake passages, during partially and fully closed positions of said valve.

5. In the combination as embodied in claim 1 said mechanism having a plurality of said fluid intake passages, a plurality of said fluid exhaust passages, pressure-stabilizing ports, one connecting the discharge ends of said exhaust passages, and another the intake ends of said intake passages, during partially and fully closed positions of said valve, and means providing an outlet into the atmosphere for the air within said chamber during rotation of the casing.

6. A hydraulic clutch adapted to be interposed as a power-transmission mechanism between rotary power-driven means and a driven shaft, said clutch comprising a rotatable casing operatively connected to the power-driven means and having a chamber therein partially filled with oil, fluid pumping means within said casing, said driven shaft extending into said casing chamber and being operatively connected with said pumping means, a cylindrical valve seat within said chamber having a fluid exhaust opening and a fluid intake opening therein, conduits connecting said valve seat exhaust and intake openings with said fluid pumping means, and a single cylindrical valve bodily slidable within said valve seat adapted upon actuation to entirely arrest, or to progressively regulate the inflow and outflow of air or of mixtures of relatively varied proportions of air and oil or of oil through said conduits and said pumping means to thereby control the stationary position or relative rotations of the driven shaft during the rotation of said power-driven means and clutch casing.

7. A hydraulic clutch adapted to be interposed as a power-transmission mechanism between rotary power-driven means and a driven shaft, said clutch comprising a rotatable casing operatively connected to the power-driven means and having a chamber therein partially filled with oil, fluid pumping means in said chamber, said driven shaft extending into said chamber and being operatively connected to said pumping means, a cylindrical valve seat within said chamber having a plurality of fluid exhaust openings and a plurality of fluid intake openings therein, conduits connecting said valve seat exhaust and intake openings with said fluid pumping means, and a single cylindrical valve bodily slidable on said valve seat adapted upon actuation to entirely arrest, or to progressively regulate the inflow and outflow of air or of mixtures of relatively varied proportions of air and oil or of oil through said conduits and said pumping means to thereby control the stationary position or relative rotations of the driven shaft during the rotation of said power-driven means and clutch casing.

8. A hydraulic clutch as embodied in claim 7 and including a pair of radially disposed spaced annular walls dividing said cylindrical valve into two sections to provide a port therebetween which is adapted during the rotation of the clutch casing, in clutch neutral or open position, to provide communication between said intake conduits and the air in the central portion of the casing chamber.

9. A hydraulic clutch as embodied in claim 7 said valve having an annular pressure-stabilizing recess adapted to interconnect all of said fluid exhaust openings, and said valve seat having an annular pressure-stabilizing recess adapted to interconnect all of said fluid intake openings during partially and fully closed positions of said valve.

10. A hydraulic clutch as embodied in claim 7 said valve having an annular pressure-stabilizing recess adapted to interconnect all of said fluid exhaust openings, said valve seat having an annular pressure-stabilizing recess adapted to interconnect all of said fluid intake openings during partially and fully closed positions of said valve, and a valve adapted, during the rotation of the clutch casing, to provide an outlet into the atmosphere for the air within the casing chamber.

11. In the combination as embodied in claim 1 and including a centrifugally and pressure responsive valve providing an outlet for the air within said chamber upon expansion of the air during the rotation of the casing.

12. A hydraulic clutch adapted to be interposed as a power-transmission mechanism between rotary power-driven means and a driven shaft, said clutch comprising a rotatable casing operatively connected to the power-driven means and having a chamber therein partially filled with oil, fluid pumping means within said casing, said driven shaft extending into said clutch chamber and being operatively connected to said pumping means, a cylindrical valve seat within said chamber having a plurality of fluid exhaust openings and a plurality of fluid intake openings therein, conduits connecting said valve seat exhaust and intake openings with said fluid pumping means, and a single cylindrical valve movably mounted on said valve seat adapted upon actuation to entirely arrest, or to progressively regulate the inflow and outflow of air or of mixtures of relatively varied proportions of air and oil or of oil through said conduits and said pumping means to thereby control the stationary position or relative rotations of the driven shaft during the rotation of said power-driven means and clutch casing.

13. A hydraulic clutch as embodied in claim 12 including pressure-stabilizing ports, one connecting the fluid discharge passages and another connecting the fluid intake passages, during partially and fully closed positions of said valve.

14. A hydraulic clutch as embodied in claim 12 and including an oil inlet in said valve, and an annular walled port in said valve which is adapted during the rotation of the clutch casing, during neutral or partially closed positions of the valve, to provide communication between said intake conduits and the air in the central portion of the casing chamber while the exhaust conduits are in communication with the casing fluid chamber through their discharge openings in the valve seat, said valve being adapted to be moved to progressively close said intake and exhaust conduits to cause a relatively increased rotation of the driven shaft until the rotation of the driven shaft is substantially synchronized with the rotation of the clutch casing whereby during such progressive closing movement of the valve the amount of air admitted into said intake conduits is progressively decreased and the amount of oil admitted through said valve inlet into said intake conduits is progressively increased until only oil may be admitted into said intake conduits while said exhaust openings are still partially open and where upon the complete closure of the exhaust openings the driven shaft will be interlocked in substantially synchronized rotation with the clutch casing.

15. A hydraulic power-transmitting mechanism comprising a rotatable power-driven casing having a chamber partially filled with oil, said oil assuming an annular form during the rotation of the casing to provide a central core of air within the casing, pumping means within said casing, a driven shaft extending into said chamber, said driven shaft being operatively connected to said pumping means and said pumping means being operatively connected to said casing, a cylindrical sleeve within said oil chamber having an intake opening and an exhaust opening located in a transverse plane spaced axially from said intake opening, enclosed passages connecting said openings with said pumping means, a cylindrical valve movably mounted on said sleeve, said valve having an air inlet port and a separate oil inlet spaced axially from said air inlet port, and means for moving said valve, said valve being normally positioned in neutral position to permit passage of only air through said air inlet port into said sleeve intake opening whereby said driven shaft is maintained in stationary position and said valve being movable to progressively decrease the flow of air and simultaneously increase the flow of oil into said sleeve intake opening until only oil is admitted into said sleeve intake opening, and said valve being thereafter movable to a position wherein both of the sleeve inlet and exhaust openings are closed to the flow of oil or air therethrough.

16. A hydraulic clutch adapted to be interposed between rotary power-driven means and a driven shaft, said clutch comprising a rotatable casing operatively connected with said power-driven means and having a chamber therein partially filled with oil whereby, during the rotation of said casing, there is provided in said chamber an outer annular zone of oil and an inner central zone of air, fluid pumping means operatively connected with said casing and with said driven shaft, fluid intake and exhaust passages communicating with said fluid pumping means and said chamber, movable fluid control means disposed within said chamber and extending from said outer annular zone of oil into said inner central zone of air, and actuable to control the flow of air, or of mixtures of air and oil, or of oil through said passages and pumping means to thereby control the stationary position or relatively variable rotations of said driven shaft during the rotation of said casing by said power-driven means.

17. A hydraulic clutch adapted to be interposed between rotary power-driven means and a driven shaft, said clutch comprising a rotatable casing operatively connected with said power-driven means and having a chamber therein partially filled with oil whereby, during the rotation of said casing, there is provided in said chamber an outer annular zone of oil and an inner central zone of air, fluid pumping means operatively connected with said casing and with said driven shaft, a plurality of fluid intake passages, a plurality of exhaust passages, said passages communicating with said fluid pumping means and said chamber, movable valve means disposed in both of said zones and movable in both of said zones to control the flow of air, or of relatively proportionately varied mixtures of air and oil, or of oil, or of neither through said passages and said pumping means to thereby control the stationary position or relatively variable rotations of said driven shaft during the rotation of said casing by said power-driven means.

18. In a hydraulic clutch including a rotatable power-driven casing having a chamber containing two fluids of different resistant value, the fluid of the higher resistant value assuming an annular form in the outer zone of said chamber during the rotation of the casing while the fluid of the lower resistant value is disposed in a central inner zone of said chamber, fluid pumping means rotatable with said casing having certain component parts operatively connected with said casing and other component parts operatively connected with said driven shaft, fluid intake and exhaust passages communicating with said pumping means and said chamber, fluid circulation control means including movable valve means and fluid by-pass means adapted to limit the maximum torque of said driven shaft, said movable valve means extending from said outer zone into said central inner zone and being actuable to control the flow of the fluid of lower resistant value, or of mixtures of both of said fluids, or of the fluid of the higher resistant value, through said passages and said pumping means to thereby control the stationary position or relatively variable rotations of said driven shaft, said fluid by-pass means including a housing in communication with the compression side of the fluid circuit and spring-pressed pressure-responsive means in said housing normally preventing passage of fluid through said fluid by-pass means, said pressure-responsive means being automatically actuable, after said movable means has been moved to a closed position, to regulate the volumetric flow of the fluid of the higher resistant value through said fluid by-pass means into said chamber in response to a demand torque of a value at least equal to the maximum torque of said driven shaft and a variation in speed of the clutch casing relatively to the speed of the driven shaft, and adjustable means adapted to be moved, during stationary position of the clutch casing, to change the spring tension of said pressure-responsive means to thereby alter the value of the maximum torque of said driven shaft.

19. A hydraulic clutch as defined in claim 18 and including a plurality of exhaust passages and a plurality of said fluid by-pass means, one of said fluid by-pass means being operatively connected with each of said exhaust passages, the volumetric capacity of all of said by-pass means limiting the working pressure of the fluid in said pumping means to a maximum pressure within the range of adjustability of said adjustable means.

20. A hydraulic clutch as defined in claim 1, the oil in said casing assuming an annular body within an outer zone of said chamber during the rotation of said casing to thereby provide an inner zone of air, and said axially slidable valve comprising a cylindrical member disposed within said oil zone and having an air inlet port extending from said oil zone into said air zone and an oil inlet disposed within said oil zone adjacent the outlet end of said air inlet port, the end portions of said cylindrical member extending axially in opposite directions beyond said air port and said oil inlet, one of said end portions being adapted to progressively close said exhaust passage, and said fluid intake passage being adapted to be closed by the other end portion after said exhaust passage has been fully closed to thereby entirely arrest the flow of fluid into and from said pumping means to thereby cause said driven shaft to be substantially interlocked for rotation with said casing.

21. A hydraulic clutch as defined in claim 16 including fluid by-pass means adapted to limit the maximum working pressure of the fluid in said pumping means and to by-pass therethrough fluid from said pumping means into said chamber, said fluid by-pass means including a housing in communication with the compression side of the fluid circuit and spring-pressed pressure-responsive means in said housing adapted to prevent flow of fluid through said fluid by-pass means, said pressure-responsive means being automatically actuable, after said movable fluid control means has been moved to a closed position, to regulate the flow of the oil solely through said fluid by-pass means in response to a demand torque of a value at least equal to the maximum torque of the driven shaft and a variation in speed of the clutch casing relatively to the speed of the driven shaft, and adjustable means on said fluid by-pass means adapted for movement, when the clutch casing is in stationary position, to change the tension of the springs of said by-pass means to thereby alter the maximum working pressure of the fluid in said pumping means.

22. A hydraulic clutch as defined in claim 17 including a fluid by-pass port for each of said exhaust passages, each port having an inlet opening in communication with the exhaust passage and an outlet spaced from said inlet and consisting of at least one outlet opening, a pressure-responsive valve for said port adapted to close said inlet and outlet openings, a spring for yieldingly retaining said valve in closed position closing said inlet and outlet openings, and adjustable means for varying the tension of said spring, said pressure-responsive valves being adapted to limit the maximum working pressure of the fluid in said pumping means and to permit flow of only oil from said pumping means through said port outlet into said chamber in response to a demand torque of a value at least equal to the maximum torque of said driven shaft upon and in response to the movement of said movable valve control means to a position closing all outlets of said exhaust passages but maintaining said intake passages open to permit flow of fluid into said pumping means, said pressure-responsive valves being automatically actuable while said control means is maintained in said closed position to regulate the volumetric flow of the oil through said port outlets during a variation in speed of the clutch casing relatively to the speed of the driven shaft.

ALBERT N. THOMAS.